April 6, 1926.
E. H. REMDE
SAFETY MECHANISM
Filed Sept. 18, 1922
1,579,455
2 Sheets-Sheet 2
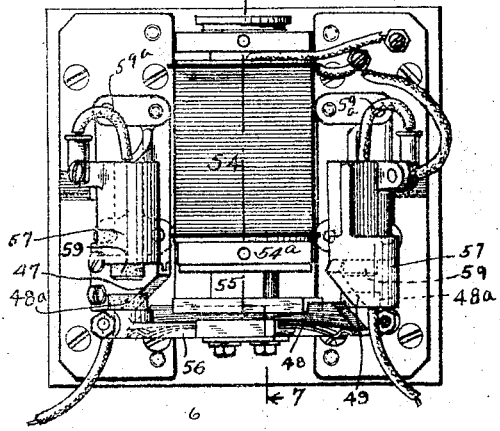
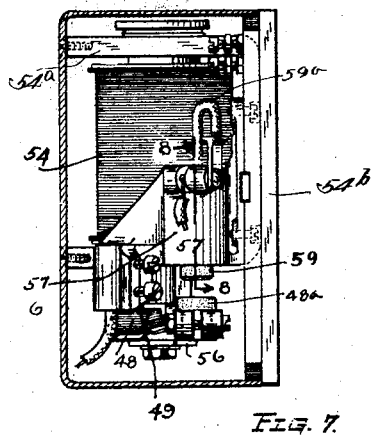
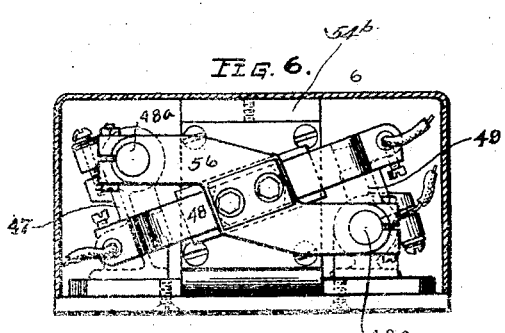
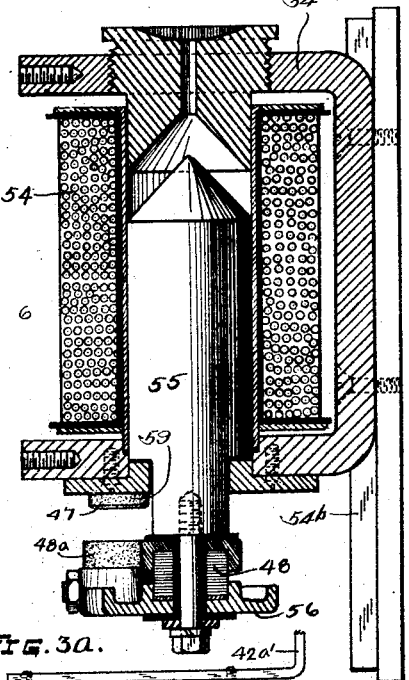
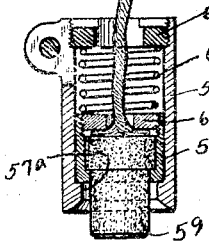
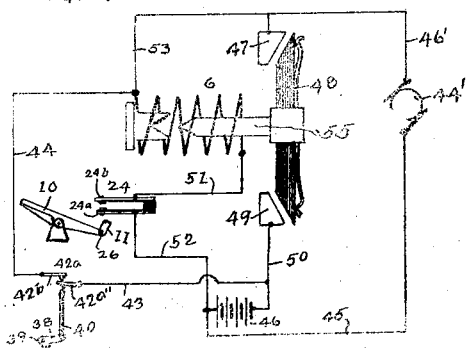
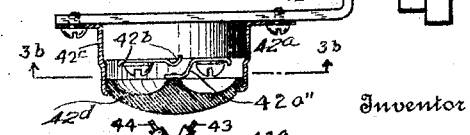
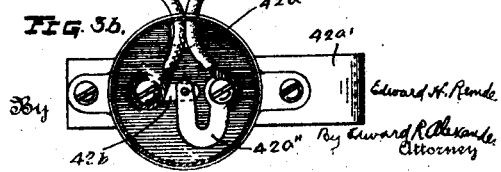

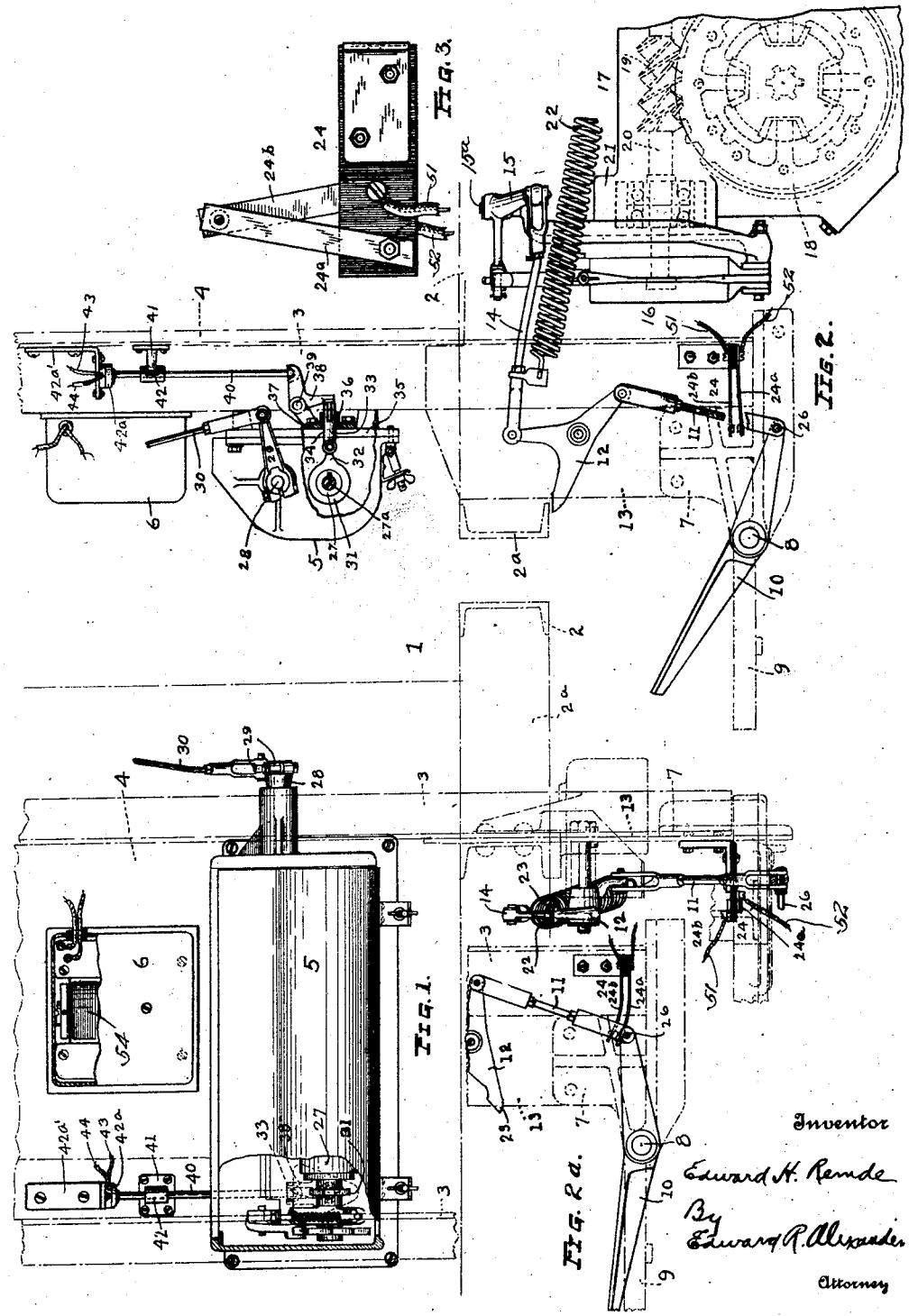

Patented Apr. 6, 1926.

1,579,455

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

SAFETY MECHANISM.

Application filed September 18, 1922. Serial No. 588,829.

*To all whom it may concern:*

Be it known that I, EDWARD H. REMDE, a citizen of the United States, residing at Cleveland, in the county of Cuyahoga and State of Ohio, have invented certain new and useful Improvements in and Relating to Safety Mechanism, of which the following is a specification.

This invention relates to a vehicle, more particularly to a safety mechanism for controlling the operation of the vehicle, whereby accidents are avoided.

One object of the invention is to provide an improved safety mechanism of relatively simple construction.

Another object of the invention is to associate with the operating members for the vehicle an automatic safety mechanism, having a solenoid and electric circuits which are opened and closed by said members to energize and de-energize the solenoid, so that in the event the operative leaves the vehicle while it is in motion the vehicle will automatically stop and cannot be again operated until one of the operating members for the vehicle is returned to its normal or neutral position.

Other objects of the invention will be apparent to those skilled in the art to which my invention relates from the following description taken in connection with the accompanying drawings, wherein—

Fig. 1 is a fragmentary view of a vehicle having a safety mechanism embodying my invention.

Fig. 2 is a fragmentary side elevation of the parts shown in Fig. 1.

Fig. 2ª is a fragmentary view showing the position of the pedal when it is operated.

Fig. 3 is a fragmentary plan view of the switch which is controlled by the brake releasing pedal.

Fig. 3ª is a sectional view of the switch which is open and closed by the controller.

Fig. 3ᵇ is a section on the line 3ᵇ—3ᵇ of Fig. 3ª.

Fig. 4 is a front elevation of the solenoid, with its cover or casing removed.

Fig. 5 is a side elevation of the solenoid.

Fig. 6 is a bottom plan view of the solenoid.

Fig. 7 is a section, enlarged, on the line 7—7 of Fig. 4.

Fig. 8 is a section on the line 8—8 of Fig. 5.

Fig. 9 is a diagram of the electrical circuits for controlling the solenoid and through it the circuit for the vehicle driving motor.

In the drawings, 1 indicates as an entirety a truck. While I have shown only a portion of a truck, it will of course be understood that it may be of any desired construction, such for example, as shown in Letters Patent No. 1,505,889 granted to me August 19th, 1924.

The truck 1 comprises a frame 2 having at one end a pair of uprights 3. The uprights 3 support a dash 4 to which is secured in any well known manner a controller 5 and a solenoid 6, to which reference will later be made. 7 indicates a pair of brackets (only one being shown) for supporting a shaft 8, on which a platform 9 may be supported. 10 indicates a lever preferably fulcrumed to rock on the shaft 8. The front of the lever 10 serves as a foot pedal; the rear end of the lever is connected to the lower end of a rod 11. The opposite end of the rod 11 is connected to a lever 12, pivoted to a side plate 13 carried by the adjacent upright 3. 14 indicates a rod connected to the lever 12 at one end and at its opposite end connected to one arm of a bell crank 15. The bell crank is mounted on a shaft 15ª, supported in any desired manner. The bell crank 15 is connected to and operates a braking mechanism, indicated as an entirety at 16.

17 indicates a driving mechanism for the vehicle or truck. The driving mechanism 17 preferably comprises a worm gear 18, operatively connected with the traction wheels for the truck, and a worm 19, the latter being fixed to a propeller shaft 20. The front end of the propeller shaft 20 is preferably extended beyond the casing 21 for the driving mechanism and carries a brake wheel, which forms one element of the braking mechanism 16. It will of course be understood that the braking mechanism may be applied to the wheels of the vehicle instead of a driven part of the driving mechanism, if desired.

22 indicates a coiled spring connected at one end to some fixed part of the vehicle frame 2. The opposite end of the spring 22 is connected in any well known manner to one of the elements of the brake operating connections between the lever 10 and the brake mechanism 16 such as the rod 14 and acts therethrough normally to apply the brake shoes or band to the wheel of the braking mechanism. As a result of this arrangement, the lever 10 is maintained in the position shown in full lines in Fig. 2; accordingly, when the operative stands on the platform 9 he can release the braking mechanism by depressing the outer end of the lever, see Fig. 2$^a$. If the operative takes his foot off the pedal or permits it to return to normal position by reason of his getting off of the platform 9, the spring 22 will cause the braking elements to be engaged and thus prevent movement of the vehicle.

24 indicates a switch, one contact of which is connected with the solenoid 6 as will be later described. The switch contacts 24$^a$, 24$^b$, may comprise a pair of members one of which is resilient to maintain them normally separated. The movable contact of the switch 24 is disposed in the path of movement of a projecting member 26 carried by the inner end of the lever 10, so that when the latter is operated to release the brake, the contacts of the switch 24 will be engaged. The purpose of the switch 24 will be later set forth.

The controller 5 preferably comprises a rotating drum 27 that is movable from a neutral position in one direction or the other to operate the vehicle forwardly or rearwardly. The shaft 27$^a$ of the drum 27 is connected through suitable gearing (not shown) with a countershaft 28. The countershaft 28 is provided with an arm 29 to which a link 30 is pivotally connected. The link 30 is connected to and operated by a suitable operating member or hand lever, not shown.

31 indicates an annular member fixed to and movable with the drum shaft 27$^a$. At one side the annular member 31 is provided with a cam 32 arranged to engage and operate a plunger 33. The plunger 33 is slidable in an opening 34 formed in the base plate 35 for the controller 5 and also in an opening 36 formed in a plate 37 fixed to the plate 35. The inner end of the plunger 33 is arranged to engage one arm of a bell crank 38 and to actuate the latter about its fulcrum 39. The other arm of the bell crank is operatively connected to the lower end of a rod 40. 41 indicates a bracket carrying a collar 42 which receives the rod 40 and guides it when moved endwise in the manner about to be described. 42$^a$ indicates a switch preferably supported on a bracket 42$^{a'}$ fixed to the dash 4. The switch 42$^a$ may be of any desired construction. The contacts 42$^{a''}$, 42$^b$, of the switch 42$^a$ are normally separated, but are arranged to be closed by the movement of the rod 40 in an upward direction. For this purpose, the switch 42$^a$ is preferably provided with a collar or annular wall 42$^c$, which slidably supports a cap 42$^d$. The cap 42$^d$ may be formed of insulating material. The cap 42$^d$ is interposed between the upper end of the rod 40 and the contact 42$^{a''}$, so that when the rod moves upwardly it will engage the cap and cause it to move the contact 42$^{a''}$ into engagement with the contact 42$^b$. The cap 42$^d$ is held within the collar 42$^c$ by a flange provided on the free edge of the collar. 43, 44, indicate leads connected to the contacts 42$^{a''}$, 42$^b$, respectively. The purpose of the switch 42$^a$ will be later set forth. The cam 32 is so arranged angularly of the shaft 27$^a$ that when the controller drum 27 is in neutral position, it will move the plunger 33 inwardly and it in turn, through the bell crank, will move the rod 40 upwardly, thereby causing the contacts 42$^{a''}$, 42$^b$, of the switch 42$^a$ to engage each other, as just described. When the drum 27 is rotated in either direction, from its neutral position, the cam 32 will allow the plunger 33 to move outwardly, the weight of the rod 40 being sufficient to effect such movement; accordingly the rod will move downwardly and permit the contacts of the switch 42$^a$ to disengage one from the other.

The purpose of the solenoid 6 is to open and close the circuit for the driving motor, indicated at 44', so that the latter can be operated by the operation of the controller; whereas the purpose of the switches 24 and 42$^a$ is to control the energizing and de-energizing of the solenoid 6 so that the circuit in which the controller is interposed can only be closed by the latter under certain conditions, to thereby avoid accidents and damage following any carelessness or neglect on the part of the operative in leaving the vehicle or in the event he is thrown from the vehicle while it is in motion.

Referring to Fig. 9: This view illustrates the position of the lever 10 and the rod 40, with the switch 24 open and switch 42$^a$ closed, as when the vehicle is standing idle. The circuit for the driving motor 44' consists of the lead 45 from one side of the battery 46 to the motor, a lead 46' from the motor 44' to the contact 47, a conductor 48 between the contact 47 and the contact 49 (the conductor 48 being separated from the contacts 47, 49, since the solenoid 6 is de-energized) and a lead 50 from the contact 49 to the other side of the battery 46. The circuit through the switch 42$^a$ consists of the lead 43 from the contact 42$^{a''}$ to one side of the battery 46—this lead being preferably connected to the lead 50, the lead 44 from the other contact 42$^b$ to one end of the solenoid winding, a lead 51 from the other end of the solenoid winding to the switch contact 24b, and a lead 52 from the contact 24a to the other side of the battery 46. If now it is desired to operate the vehicle, the operative, after getting on the platform 9, operates the lever 10 downwardly. This operation releases the brake and closes the switch 24, which completes the circuit through the leads 51, 52, 43, 44, switch 42a, and solenoid winding, thereby energizing the latter. As a result, the solenoid core moves the conductor 48 into engagement with the contacts 47 and 49. The controller 5 may now be operated in either direction. If the controller is operated, the cam 32 will rotate therewith, and thus permit the rod 40 to move downwardly and allow the switch 42a to open, thereby opening the circuit just referred to. To prevent the de-energizing of the solenoid winding when this circuit is opened, I provide a lead 53 between the lead 44 of the solenoid winding and the contact 47, so that the circuit through the solenoid winding will be completed through the contacts 47, 49 and conductor 48. Accordingly, it will be seen that so long as the lever 10 is maintained in its operative position and the switch 24 closed, the solenoid will be energized and the circuit for the motor will be completed through the conductor 48 and contacts 47 and 49; but should the foot be removed from the lever 10, the switch 24 will be opened and the circuit through the leads 51, 52, 53, solenoid winding, contact 47, conductor 48, contact 49 and lead 50 will be broken and thus result in de-energizing the solenoid 6. If this operation takes place while the controller drum is in an operated position either for forward or reverse driving operation, it will be impossible to again close the circuit just referred to by the operation of the lever 10 downwardly, since the switch 42a is open. However, if the controller is moved to its neutral position, the cam 32 will cause the switch 42a to close, following which the lever 10 may be operated to close the circuit through the solenoid winding and thus complete the motor circuit through the contacts 47, 49 and conductor 48.

From the foregoing description it will be seen that no damage or accident can result should an operative attempt to run the vehicle where previously the controller has been left in an operated position. In order to operate the vehicle, two conditions must exist, namely, (1) the controller drum 27 must be in neutral position and (2) the lever 10 must be operated to release the brake and close the switch 24. Accordingly, in the event the operative, after setting the vehicle in motion, falls off or purposely leaves the platform, the vehicle cannot be set in motion by the operation of the lever 10 for the reason, as already pointed out, it is first necessary to return the controller drum to neutral position in order to close the switch 42a.

It will also be seen that my construction is exceedingly simple in that the circuit through the solenoid for energizing it or maintaining it energized during operation of the vehicle is independent of the motor and also the motor circuit except in so far as the circuit for the solenoid is shunted through the contacts 47, 49 and conductor 48.

The solenoid 6 may be of any desired construction but by preference it comprises the following instrumentalities; 54 indicates a coil, preferably supported by a U member 54a on a plate 54b. 55 indicates the core carrying at its lower end the conductor 48. 56 indicates a supplemental conductor fixed to the conductor 48 and carrying at its opposite ends a pair of contacts 48a. 57, 57, indicate a pair of cylinders preferably formed integrally with the contacts 47, 49. 58 indicates a cup shaped member slidably mounted in each cylinder 57 and arranged to hold a carbon contact 59 connected by a wire 59a with the adjacent lead. The carbon contact 59 is held in place by a cap 60 having screw threaded connection with the upper end of the cup member 58. 61 indicates a spring acting on the cap 60 and normally tending to push the cup member 58 downwardly against a flange 57a provided on the lower end of the adjacent cylinder 57. The upper end of the spring 61 abuts against a plate 62 removably fitting the upper or open end of the cylinder 57. By the arrangement described, the carbon contacts remain in engagement with the contacts 48a until after the conductor 48 disengages the contacts 47, 49, thus preventing arcing between these latter elements. By mounting the carbon contacts 59 to slide in the cylinders 57, they will be moved inwardly by the contacts 48a against the tension of the springs 61, when the solenoid is operated to engage the conductor with the contacts 47, 49.

To those skilled in the art to which my invention relates many alterations in construction and widely differing embodiments and applications of my invention will suggest themselves without departing from the spirit and scope thereof. My disclosures and the description herein are purely illustrative and are not intended to be in any sense limiting.

What I claim is:

1. In apparatus of the class described, the combination with mechanism to be operated, including an electric motor, of a motor circuit, said circuit including a pair of contacts and a conductor arranged to engage and disengage said contacts; a controller interposed in said circuit, a pair of members, one for operating said controller and the other effecting the operation of said mechanism, and electrically operated means associated with said members and arranged to cause said conductor to engage said contacts when one of said members is in neutral position and the other is operated.

2. In apparatus of the class described, the combination with mechanism to be operated, including an electric motor, of a motor circuit, said circuit including a pair of contacts and a conductor arranged to close and open said circuit through said contacts, a controller interposed in said circuit, a pair of members, one for operating said controller and the other effecting the operation of said mechanism, and electrically operated means associated with said members and arranged to operate said conductor when said controller operating member is in neutral position and the other is operated.

3. In apparatus of the class described, the combination with mechanism to be operated, including an electric motor, of a motor circuit, said circuit including a pair of contacts and a conductor arranged to engage and disengage said contacts, a controller interposed in said circuit, a pair of members, one for operating said controller and the other effecting the operation of said mechanism, and electrically operated means associated with said members and arranged to cause said conductor to engage said contacts when one of said members is in neutral position and the other is operated, but arranged to be ineffective if the first mentioned member is in an operated position.

4. In apparatus of the class described, the combination with mechanism to be operated, said mechanism including an electric motor and a member controlling the operation of said mechanism, of a motor circuit including a pair of contacts and a conductor, a device interposed in said circuit arranged to effect operation of the motor in either direction, a solenoid, the core of said solenoid being connected to said conductor and arranged to move it to close the circuit through said contacts when the solenoid winding is energized, a circuit through the solenoid winding, a pair of switches in said last mentioned circuit, one of said switches being closed when said device is in neutral position and the other switch being normally open but arranged to be closed when said member is operated, and a lead from one end of the solenoid winding to one of said contacts, whereby the circuit through the solenoid winding will be completed during operation of said device while said member is maintained in its operated position.

5. In apparatus of the class described, the combination with mechanism to be operated, said mechanism including an electric motor and a device controlling the operation of said mechanism, of a motor circuit including a pair of contacts and a conductor, a controller interposed in said circuit, a solenoid, the core of said solenoid being connected to said conductor and arranged to move it to close the circuit through said contacts when the solenoid winding is energized, a circuit through the solenoid winding, a pair of switches in said last mentioned circuit, one of said switches being closed when the controller is in neutral position but arranged to be opened when the controller is operated, and the other switch being normally open but arranged to be closed when said device is operated, and a lead from one end of the solenoid winding to one of said contacts, whereby the circuit through the solenoid winding will be completed during operation of said controller while said device is maintained in its operated position.

6. In apparatus of the class described, the combination with mechanism to be operated, said mechanism including an electric motor and a normally applied braking means, of a member for releasing said braking means, a motor circuit including a pair of contacts and a conductor, a device interposed in said circuit for operating said motor in either direction, a solenoid, the core of said solenoid being connected to said conductor and arranged to move it to close the circuit through said contacts when the solenoid winding is energized, a circuit through the solenoid winding, a pair of switches in said last mentioned circuit, one of said switches being closed when said device is in neutral position and the other switch being normally open but arranged to be closed when said member is operated, and a lead from one end of the solenoid winding to one of said contacts, whereby the circuit through the solenoid winding will be completed during operation of said device while said member is maintained in its operated position.

7. In apparatus of the class described, the combination of an electric motor, a motor circuit including a make and break device, means in said circuit for effecting operation of the motor in either direction, a normally applied braking means for said motor, a member for releasing said braking means, a solenoid, the core of said solenoid being connected to the movable element of said make and break device, a pair of switches in circuit with the winding of said solenoid, one switch being closed when said means are in neutral position and open when they are operated and the other switch being normally open but arranged to be closed when said member is operated, and a lead from one end of the solenoid winding to one element of said make and break device, whereby the circuit through the solenoid winding will be maintained during operation of said circuit controlling means while said brake means releasing member is in its operated position.

8. In apparatus of the class described, the combination with mechanism to be operated, including an electric motor, of a motor circuit, and a source of current supply therefor, said circuit including a make and break device connected to said source of current supply, a controller interposed in said circuit, a pair of members, one for operating said controller and the other effecting the operation of said mechanism, and electrically operated means associated with said members and connected with said make and break device and arranged to operate the latter in one direction when one of said members is in neutral position and the other member is operated.

9. In apparatus of the class described, the combination with mechanism to be operated, including an electric motor, of a motor circuit and a source of current supply therefor, said circuit including a make and break device, a controller interposed in said circuit, a pair of members, one for operating said controller and the other effecting the operation of said mechanism, and electrically operated means associated with said members arranged to operate said make and break device when one of said members is in neutral position and the other is operated, but arranged to be ineffective if the first mentioned member is in an operated position.

10. In apparatus of the class described, the combination with mechanism to be operated, said mechanism including an electric motor and a member controlling the operation of said mechanism, of a motor circuit including a make and break device, means interposed in said circuit and arranged to effect operation of the motor in either direction, a solenoid, the core of said solenoid being connected to the movable member of said make and break device and arranged to move it into engagement with the other member thereof when the solenoid winding is energized, a circuit through the solenoid winding, a pair of switches in said last mentioned circuit, one of said switches being closed when said operating means is in neutral position and the other switch being normally open but arranged to be closed when said controlling member is operated, and a lead from one end of the solenoid winding to one of the members of said make and break device, whereby the circuit through the solenoid winding will be completed during operation of said operating means while said member is maintained in its operated position.

11. In apparatus of the class described, the combination with mechanism to be operated, said mechanism including an electric motor and a member controlling the operation of said mechanism, of a motor circuit including a source of current supply and a make and break device, a controller interposed in said circuit, a solenoid, the core of said solenoid being connected to the movable member of said make and break device and arranged to complete the circuit therethrough when the solenoid winding is energized, a circuit through the solenoid winding, a pair of switches in said last mentioned circuit, one of said switches being closed when the controller is in neutral position but arranged to be opened when the controller is operated, and the other switch being normally open but arranged to be closed when said controlling member is operated, and a lead from that end of the solenoid winding remote from its connection with the last mentioned switch to that member of the make and break device which is disconnected from said source of current supply when said device is open, whereby the circuit through the solenoid winding will be completed during operation of said controller while said controlling member is maintained in its operated position.

12. In apparatus of the class described, the combination of an electric motor, a source of current supply, a make and break device, one member thereof being connected to one side of said source of current supply and the other member thereof being connected through said motor with the other side of said source of current supply, means interposed in the connections with said source of current supply for effecting operation of the motor in either direction, a braking means for said motor, an element for operating said braking means, a solenoid connected to said source of current supply, the core of said solenoid being connected to the movable member of said make and break device, a pair of switches in circuit with the winding of said solenoid, one of said switches being closed when said motor operating means are in neutral position and open when said means are operated and the other switch being normally open but arranged to be closed when said element is operated, and a connection between that end of the solenoid winding remote from its connection with the last mentioned switch and that member of the make and break device which is connected through the motor with said source of current supply.

13. In apparatus of the class described, the combination of a source of current supply, an electric motor, a circuit for said motor connected to the opposite sides of said source of current supply, said circuit including means for controlling the operation of the motor and a make and break device, a separate circuit connected with the opposite sides of said source of current supply, said separate circuit including a solenoid having its core connected to the movable element of said make and break device for closing it when the solenoid winding is energized, a pair of switches in circuit with said solenoid, connections between said controlling means and one of said switches and arranged to close the latter when said controlling means are in neutral position but arranged to permit said switch to open when said means are operative, means for closing the other switch, and a connection between that end of the solenoid winding remote from its connection with the last mentioned switch and that member of the make-and-break device which is connected to that side of said source of current supply opposite to that side to which said switch is connected.

14. In an apparatus of the class described, the combination of mechanism to be operated, an operating member effecting the operation of said mechanism, a source of electrical energy, an electric motor, a circuit for said motor, including a controller and a make-and-break device, a solenoid having its core connected to the movable element of said make-and-break device, whereby the elements thereof are engaged when the solenoid is energized, a circuit through the winding of said solenoid, including a pair of switches, one normally open and arranged to be closed by the operation of said operating member and the other operatively connected with said controller, whereby it is closed when said controller is in neutral position and open when the controller is operated, and a shunt circuit from one end of the solenoid winding through the make-and-break device, whereby the solenoid winding is maintained energized during operation of said controller.

15. In apparatus of the class described, the combination with a solenoid, of a make and break device having a stationary member and a movable member, said latter member being connected to and movable by the core of said solenoid, a circuit arranged to be closed by the engagement of said members, and contacts mounted on said members, one of said contacts being mounted to move on the adjacent member, whereby it will move relative thereto when said movable member is operated to open said circuit to maintain the circuit through said make and break device until after the members thereof have separated.

16. In apparatus of the class described, the combination with a solenoid, of a pair of contacts, a conductor connected with the core of said solenoid, a circuit having leads connected to said contacts and arranged to be completed when said conductor is engaged therewith, a supplemental conductor connected to and movable with said first mentioned conductor, and separate pairs of contacts supported by said supplemental conductor and said first mentioned contacts, one of the contacts of each pair being movable relative to its support when said core is operated to disengage said first mentioned conductor from said contacts to maintain the circuit through the latter until after said conductor has become disengaged from said contacts.

17. In apparatus of the class described, the combination with a solenoid, of a pair of contacts, a conductor connected with the core of said solenoid and arranged to be moved thereby into engagement with said contacts, a pair of separate contacts carried by said conductor, a pair of cylinders each in electrical connection with one of said first mentioned contacts, and a contact element slidably mounted in each of said cylinders and arranged to engage the adjacent separate contact, said contact elements being movable a predetermined distance with said conductor while in engagement with said separate contacts to maintain the circuit through the conductor until after it has become disengaged from said first mentioned contacts.

In testimony whereof, I have hereunto subscribed my name.

EDWARD H. REMDE.

Certificate of Correction.

It is hereby certified that in Letters Patent No. 1,579,455, granted April 6, 1926, upon the application of Edward H. Remde, of Cleveland, Ohio, for an improvement in "Safety Mechanism," an error appears in the printed specification requiring correction as follows: Page 5, line 61, claim 10, before the word "member" insert the word *controlling;* and that the said Letters Patent should be read with this correction therein that the same may conform to the record of the case in the Patent Office.

Signed and sealed this 23d day of November, A. D. 1926.

[SEAL.]

M. J. MOORE,
*Acting Commissioner of Patents.*